United States Patent [19]
Takahashi

[11] Patent Number: 5,903,848
[45] Date of Patent: May 11, 1999

[54] METHOD OF AND APPARATUS FOR DYNAMIC CHANNEL ALLOCATION

[75] Inventor: Hideaki Takahashi, Tokyo, Japan

[73] Assignee: NEC Corporation, Tokyo, Japan

[21] Appl. No.: 08/822,903

[22] Filed: Mar. 24, 1997

[30] Foreign Application Priority Data

Mar. 25, 1996 [JP] Japan ................................. 8-067905

[51] Int. Cl.$^6$ ........................................ H04Q 7/00
[52] U.S. Cl. ..................... 455/512; 455/527; 455/452; 455/450; 379/59; 379/58; 379/60
[58] Field of Search ...................... 455/62, 54.1, 58.1, 455/58.2, 67.1, 512, 527, 450, 452, 34.1, 34.2; 379/59, 60; 370/329, 330, 336, 431, 444, 461, 462

[56] References Cited

U.S. PATENT DOCUMENTS

| | | | |
|---|---|---|---|
| 5,521,906 | 5/1996 | Grube et al. | 370/17 |
| 5,613,200 | 3/1997 | Hamabe | 455/33.1 |
| 5,666,654 | 9/1997 | Kanai | 455/512 |
| 5,666,655 | 9/1997 | Ishikawa et al. | 455/512 |
| 5,787,358 | 7/1998 | Takahashi | 455/512 |

FOREIGN PATENT DOCUMENTS

| | | |
|---|---|---|
| 0202485 | 11/1986 | European Pat. Off. . |
| 0666699 | 8/1995 | European Pat. Off. . |
| 61-244137 | 10/1986 | Japan . |
| 4-94228 | 3/1992 | Japan . |
| 4-220822 | 8/1992 | Japan . |
| 4-345331 | 12/1992 | Japan . |
| 2266433 | 10/1993 | United Kingdom . |
| 2292655 | 2/1996 | United Kingdom . |
| 2305336 | 4/1997 | United Kingdom . |

OTHER PUBLICATIONS

Furuya et al., "Channel Segregation, A Distributed Adaptive Channel . . . Mobile Radio Communications", *The Inst. of Elect. and Comm. Engineers of Japan,* National Convention Record, 1986, pp. 10–47.

*Primary Examiner*—Wellington Chin
*Assistant Examiner*—Sheila B. Smith
*Attorney, Agent, or Firm*—Sughrue, Mion, Zinn, Macpeak & Seas, PLLC

[57] ABSTRACT

A dynamic channel allocation process successively allocates channels of higher priorities to requests for channel allocation. When a priority change count overflows or reaches an upper limit, the priority change count is cleared to zero. However, past data are not eliminated, and a change in a base station service area can be handled. Specifically, when the priority change count reaches an upper limit n, the priority at that time is stored as $M_1$, and fixed as it is until the priority change count reaches the upper limit n next time. When priority change count reaches the upper limit n twice, the priority at that time is updated to $M_2$ and stored fixedly for use as the priority until the priority change count subsequently reaches the upper limit n.

7 Claims, 8 Drawing Sheets

| CHANNEL | $C_1$ | $C_2$ | $C_3$ | ... | $C_i$ | ... | $C_n$ |
|---|---|---|---|---|---|---|---|
| PRIORITY | $P_1$ | $P_2$ | $P_3$ | ... | $P_i$ | ... | $P_n$ |

METHOD OF AND APPARATUS FOR DYNAMIC CHANNEL ALLOCATION

BACKGROUND OF THE INVENTION

1. Field of the Invention

The present invention relates to a method of and an apparatus for dynamic channel allocation to reduce interference between channels of a radio communication system, particularly a mobile radio communication system.

2. Description of the Related Art

In the field of mobile radio communications, it has been customary to employ a fixed allocation process for controlling fixed frequencies to be used in each radio base station (hereinafter referred to as "base stations") at the stage of planning of installation of the base station in view of the prevention of interference between the base stations for effective utilization of frequencies.

The fixed allocation process, however, is unable to flexibly handle calls which vary from time to time.

For example, when all channels of a base station X are busy, whereas sufficient empty channels are available in an adjacent station Y, then any new call originated within the base station X suffers a call loss. If any empty channel available in the adjacent station Y can be used by the base station X, such a new call does not suffer a call loss.

To eliminate the above shortcoming of the fixed allocation process, there has been employed a dynamic channel allocation system which allows all base stations involved to freely use all available channels.

While various schemes are present for the dynamic channel allocation system, the dynamic channel allocation system basically operates by allowing all base stations involved to freely use all available channels after it has been checked whether a channel which is going to be used by a base station is not being used by an adjacent base station. Such a check is carried out because if each base station independently selected a channel without regard to the service area configuration of the base stations, then interference would possibly be caused due to fading or the like.

A dynamic channel allocation system has been proposed in which base stations individually studies their service area configuration to reduce interference. Such a proposed dynamic channel allocation system is disclosed in "Proposal of a self-controlled distributed channel allocation system, a channel isolation system", Koretsuna Furuya et al., Electronic Communication Society, General National Conference 10–47, 1986, and Japanese laid-open patent publication No. 61-244137. The dynamic channel allocation system based on channel isolation principles will be described below.

FIG. 1 shows a general mobile communication system. In FIG. 1, a mobile exchange 1 having a control circuit $1_a$ connects calls to a public telephone network PSK and controls connection and distribution of calls of four base stations $2_1$~$2_4$. The base stations $2_1$~$2_4$ are connected respectively to antennas $3_1$~$3_4$.

The base stations $2_1$~$2_4$ have respective service areas $4_1$~$4_4$, as shown in FIG. 2. In FIG. 2, mobile radio stations (hereinafter referred to as ("mobile stations") $5_1$, $5_2$ are present in the respective service areas $4_1$, $4_4$. If the same frequency $f_1$ is used at the same time in the area where service areas $4_3$, $4_4$ overlap each other, signals which use the same frequency f1 interfere with each other. However, if different frequencies $f_2$, $f_3$ are used in the area where service areas $4_1$, $4_2$ overlap each other, signals which use the different frequencies $f_2$, $f_3$ do not interfere with each other.

Priorities $P_1$, $P_2$, ..., $P_i$, ..., $P_n$ as shown in FIG. 3 are initially assigned respectively to channels $C_1$, $C_2$, ..., $C_i$, ..., $C_n$ differently for each base station such that the channels will not overlap each other between adjacent service areas of base stations. The term "channels" used herein include the concept of slots which are used in channels based on time-division principles.

The priorities $P_1$, $P_2$2, ..., $P_i$, ..., $P_n$ shown in FIG. 3 are updated according to a routine shown in FIG. 4. The routine shown in FIG. 4 is carried out for each of the base stations $2_1$~$2_4$. For example, the routine shown in FIG. 4 for all the base stations $2_1$~$2_4$ is stored in the control circuit $1a$ shown in FIG. 1.

According to the routine shown in FIG. 4, an initial value of the priority $P_i$ (i=1,2, ...,n) is established as system data in an external memory or an internal memory (step 1001). Then, a priority change count a is set to "0" (step 1002). If a communication request comes from a mobile station or a public network (step 1003), then the priority table shown in FIG. 3 is read from the memory, and a channel having the maximum priority is selected (step 1004). Then, it is determined whether the selected channel is an empty channel or not (step 1005). If the selected channel is an empty channel, then the priority P of the selected channel is increased (step 1006) as follows:

$$P=P+\Delta P(a)$$

where $\Delta P(a)$ represents a priority function determined by the priority change count a. The priority function $\Delta P(a)$ is larger as the priority change count a is smaller as shown in FIG. 5. Then, the channel selected in the step 1004 is allocated (a step 1007).

If the selected channel is not an empty channel in step 1005, then the priority P of the selected channel is reduced as follows (1008):

$$P=P-(P'(a)$$

Thereafter, it is determined whether there is any remaining channel which has not been selected in the step 1004 (step 1009). If there is any remaining channel, then the selected channels are excluded (step 1010), and the control returns to the step 1004. If there is not any remaining channel, then a call loss occurs, and a busy signal is generated (step 1011).

After the selected channel is allocated in the step 1007 or the busy signal is generated in the step 1011, the priority change count a is incremented by "1" (step 1012). Then, it is determined whether the priority change count a has reached an upper limit value $n=a_0$, e.g., "256" (step 1013). If the priority change count $a=a_0$, then the control returns to the step 1003. If the priority change count $a>a_0$, then the control returns to the step 1002 where the priority change count a is cleared to "0", and thereafter the control proceeds to the step 1003.

As described above, the priority is given to each of the channels, and those channels which have higher priorities are successively allocated. The priority of a channel is increased each time the channel is used, and is reduced if the channel cannot be used.

The dynamic channel allocation system based on channel isolation principles uses the priority function $\Delta P(a)$ for calculating the priority P. Various patterns have been proposed for use as the priority function $\Delta P(a)$. However, the priority function $\Delta P(a)$ with the priority change count a used as a parameter as shown in FIG. 5 is mainly employed in the art for easily determining the priority P. To realize the priority function ΔP(a) actually, however, the value of the priority change count a diverges infinitely. Therefore, the priority change count a is cleared to "0" when its value reaches an upper limit. This poses a problem because the data accumulated in the past are eliminated, preventing the system from developing a learning effect.

The priority function ΔP(a) is greater as the priority change count a is smaller and is smaller as the priority change count a is greater. Consequently, the dynamic channel allocation system tends to become stabilized quickly when the service area configuration starts to be learned. However, when the dynamic channel allocation system is subjected to an abrupt change in the environment after the service areas have sufficiently been settled, e.g., when a new base station is added to a service area, the dynamic channel allocation system responds slowly, and it takes time before it becomes stabilized for asigning good and appropriate priority. For example, FIG. 6 shows a simulated result of priority ratio when an interference detection ratio changed from 0.5 to 0.8 for the priority change count determined by the conventional return mode using the priority function ΔP(a) shown in FIG. 5.

SUMMARY OF THE INVENTION

It is an object of the present invention to provide a method of and an apparatus for dynamic channel allocation to allocate channels specifically to requests for channel allocation while maintaining accumulated data of the past.

To achieve the above object, there is provided in accordance with the present invention a method of dynamic channel allocation in a mobile communication system, comprising the steps of assigning priority ($P_j$) to each of channels between radio base stations ($2_1 \sim 2_4$) and ratio mobile stations ($5_1 \sim 5_2$), incrementing by "1" a priority change count a, representing the number of times that the priority changes, each time a request for channel allocation occurs with respect to the radio mobile stations, selecting a channel of higher priority in response to each request for channel allocation, allocating the selected channel to the request for channel allocation and increasing the priority of the selected channel by a first priority function ΔP(a) depending on the priority change count a, if the selected channel is not busy, reducing the priority of the selected channel by a second priority function ΔP'(a) depending on the priority change count a, if the selected channel is busy, clearing the priority change count a to "0" when the priority change count a reaches a predetermined upper limit n, updating and saving the priority $M_i=PM_i$ depending on a numerical value n xi, which is the product of the upper limit n and the number of times i that the priority change count a reaches the upper limit n, each time the priority change count a reaches the upper limit n, and using the priority $M_i$ consecutively without change as the priority of the channel for channel selection until the priority change count a reaches the upper limit n.

The first priority function and the second priority function may be identical to each other.

When the higher priority $M_i$ is saved, the priority changed depending on the priority function is not used as the priority.

According to the present invention, there is also provided an apparatus for dynamic channel allocation in a mobile communication system, comprising a channel priority counter for incrementing a priority change count a by "1" for each of the channels each time the channel is checked for assigment in ewaponaw ro a request for channel allocation between a base station and a radio mobile station, means for selecting a channel having a higher priority with smaller interference from other base stations, means for allocating the selected channel in response to the request for channel allocation and increasing the priority of the selected channel by a first priority function ΔP(a) depending on the priority change count a, if the selected channel is not busy, means for reducing the priority of the selected channel by a second priority function ΔP'(a) depending on the priority change count a, if the selected channel is busy, means for clearing the priority change count a to "0" when the priority change count a reaches a predetermined upper limit n, means for updating and saving, as the higher priority, the priority $M_i$ depending on a numerical value n×i, which is the product of the upper limit n and the number of times i that the priority change count a reaches the upper limit n, each time the priority change count a reaches the upper limit n, and means for using the priority $M_i$ consecutively without change, as the priority of the channel for channel selection until the priority change count a reaches a next count n×(i+1).

Each of the first priority function and the second priority function may be greater as the priority change count a is smaller.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1:
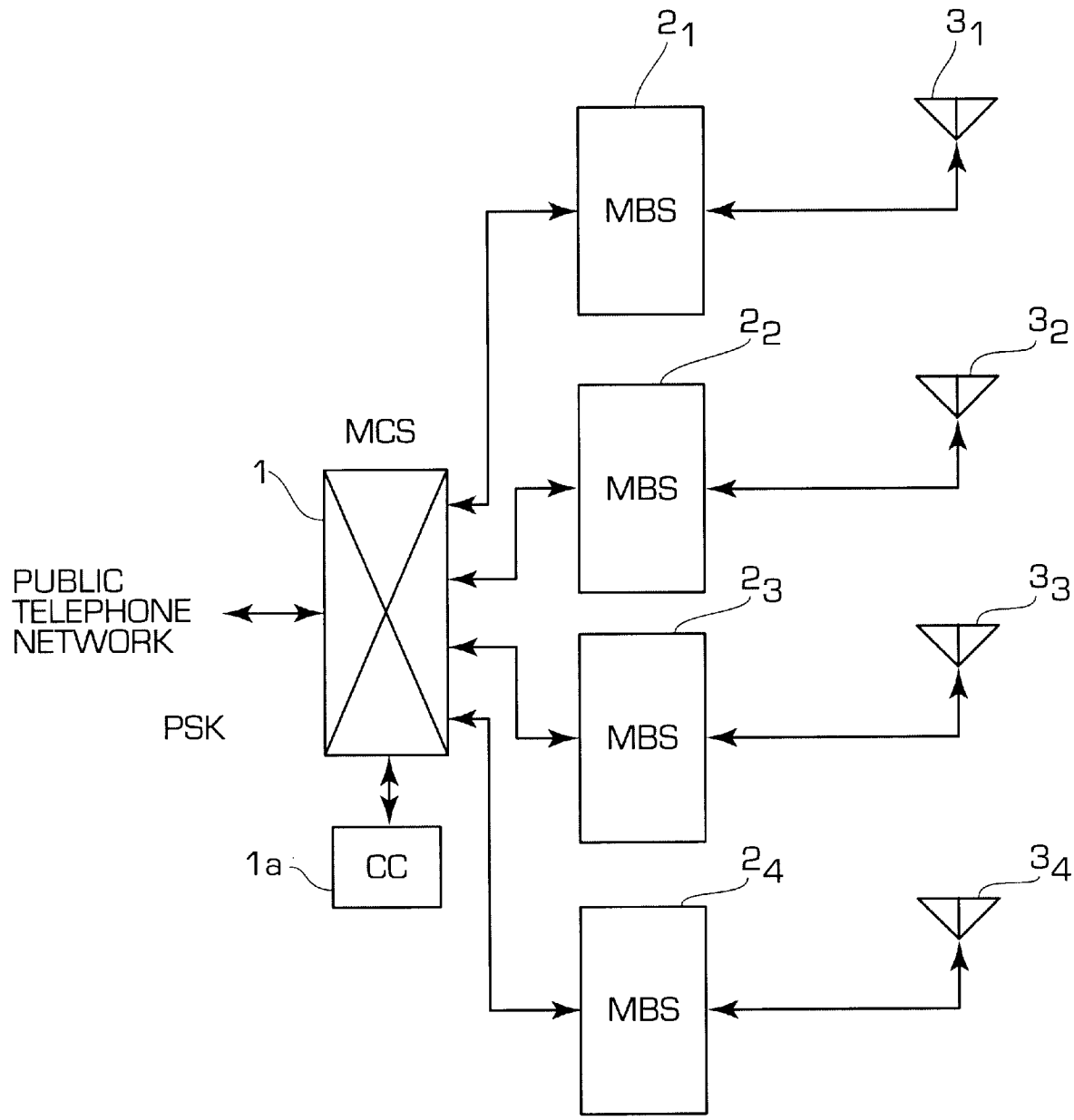
FIG. 1 is a block diagram of a general mobile communication system.
Figures 2, 3:
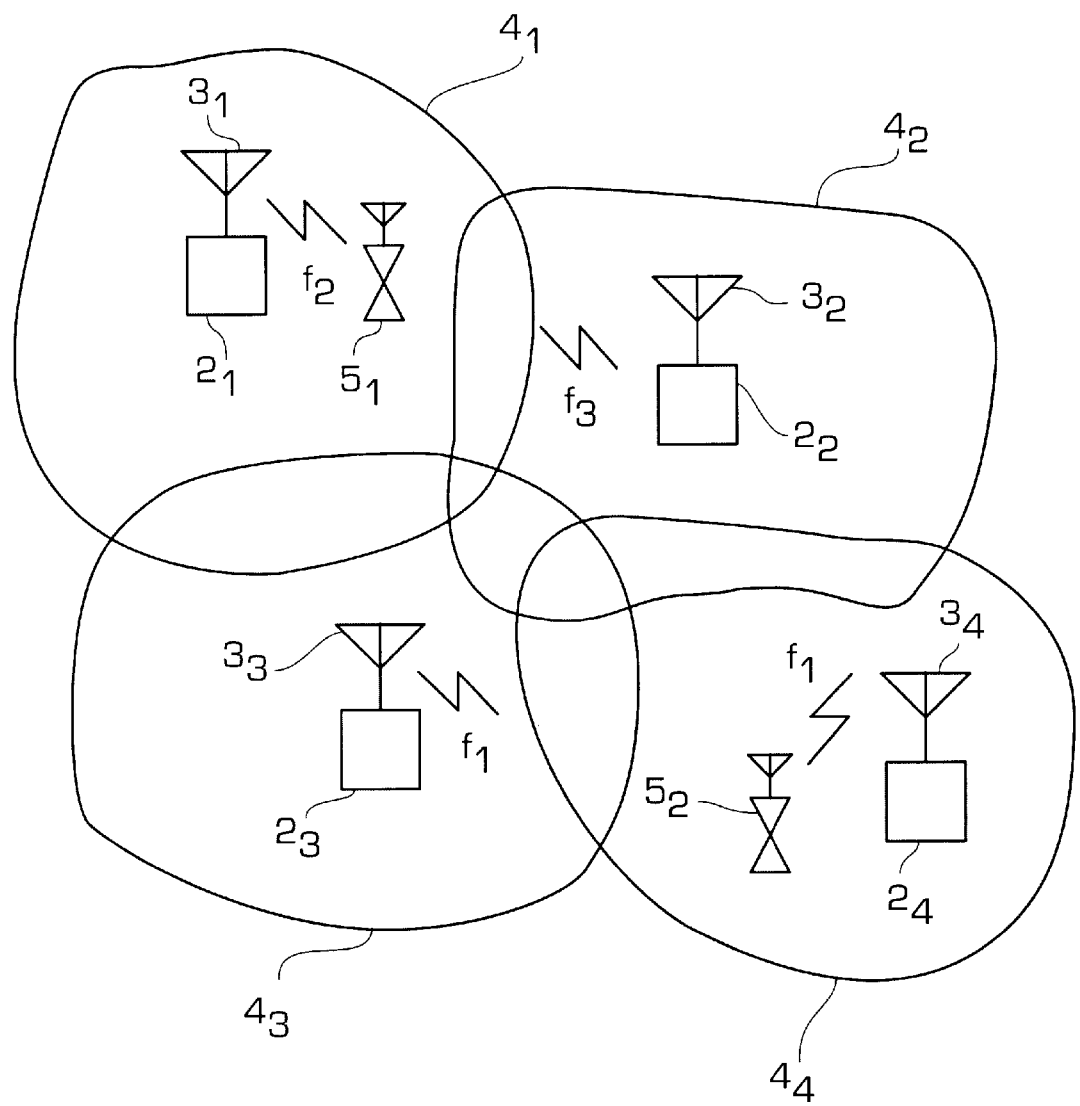
FIG. 2 is a view of service areas of the mobile communication system shown in FIG. 1.
FIG. 3 is a table of channels and priorities used in a conventional dynamic channel allocation process.
Figure 4:
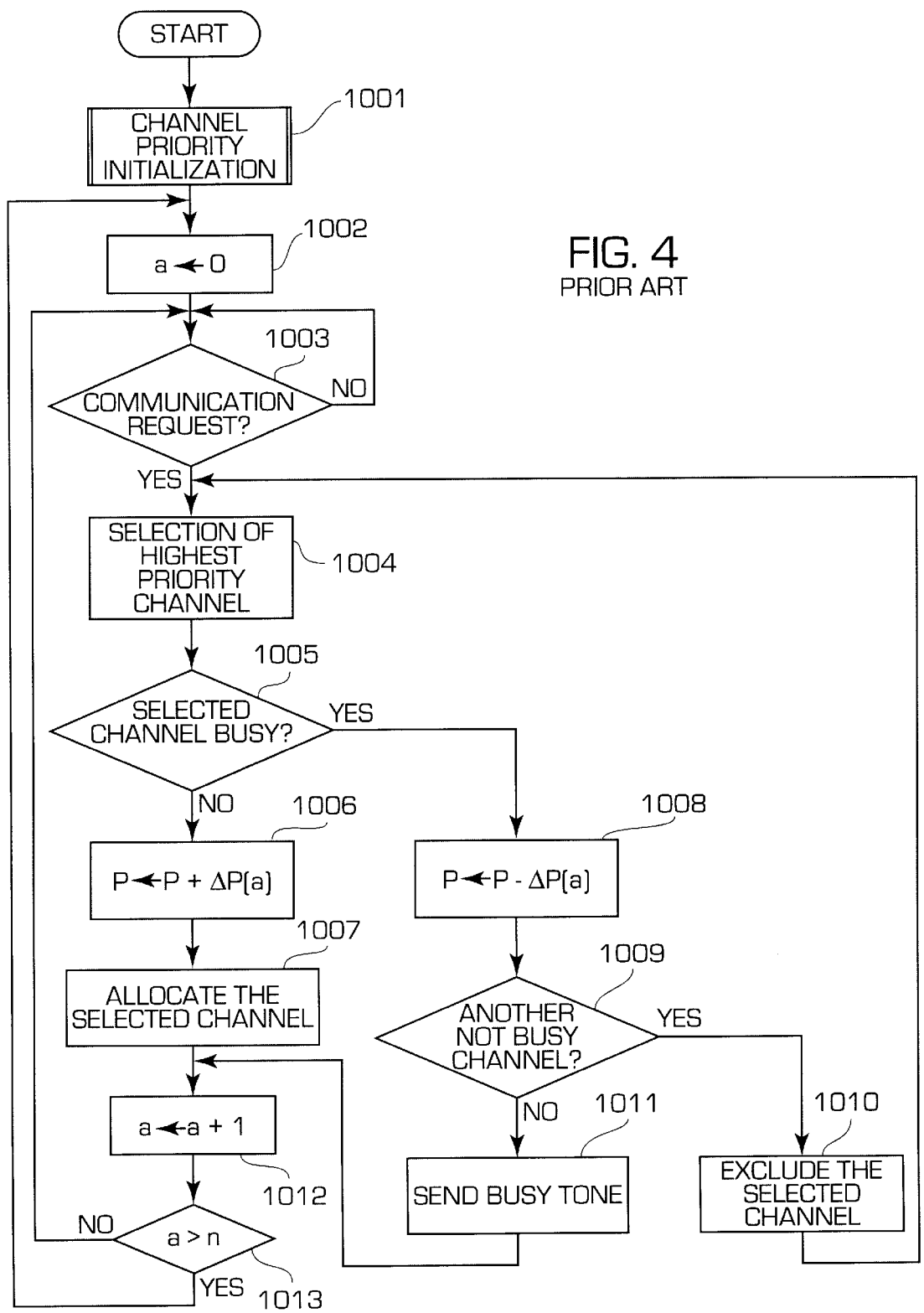
FIG. 4 is a flowchart of an operation sequence of the conventional dynamic channel allocation process.
Figure 5:
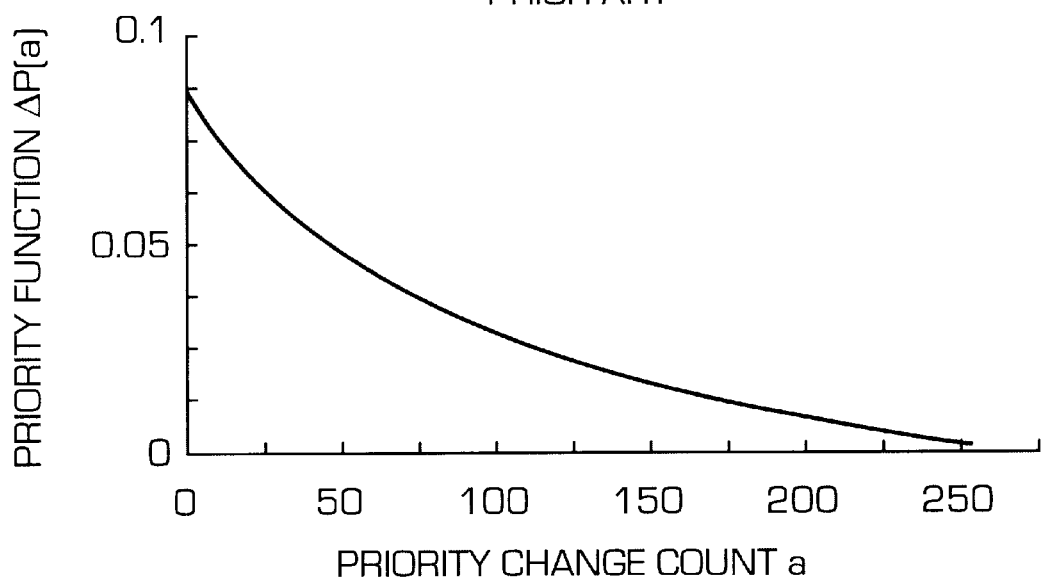
FIG. 5 is a graph showing a priority function used in the operation sequence shown in FIG. 4.
Figure 6:
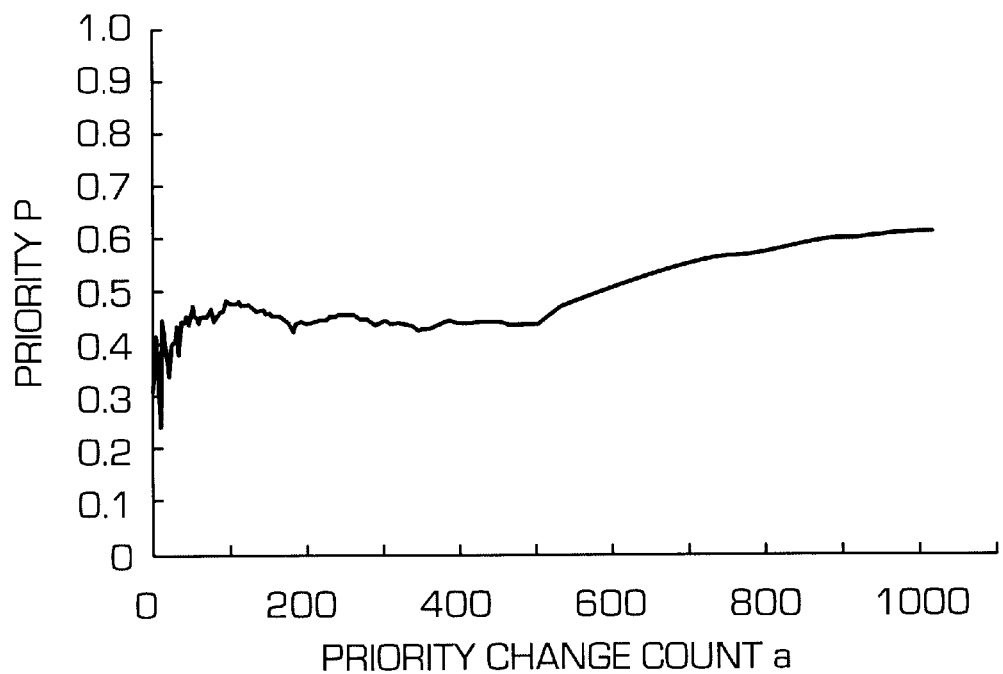
FIG. 6 is a graph showing a simulated result of the priority ratio for the priority change counts determined by the conventional dynamic channel allocation process.
Figure 7:
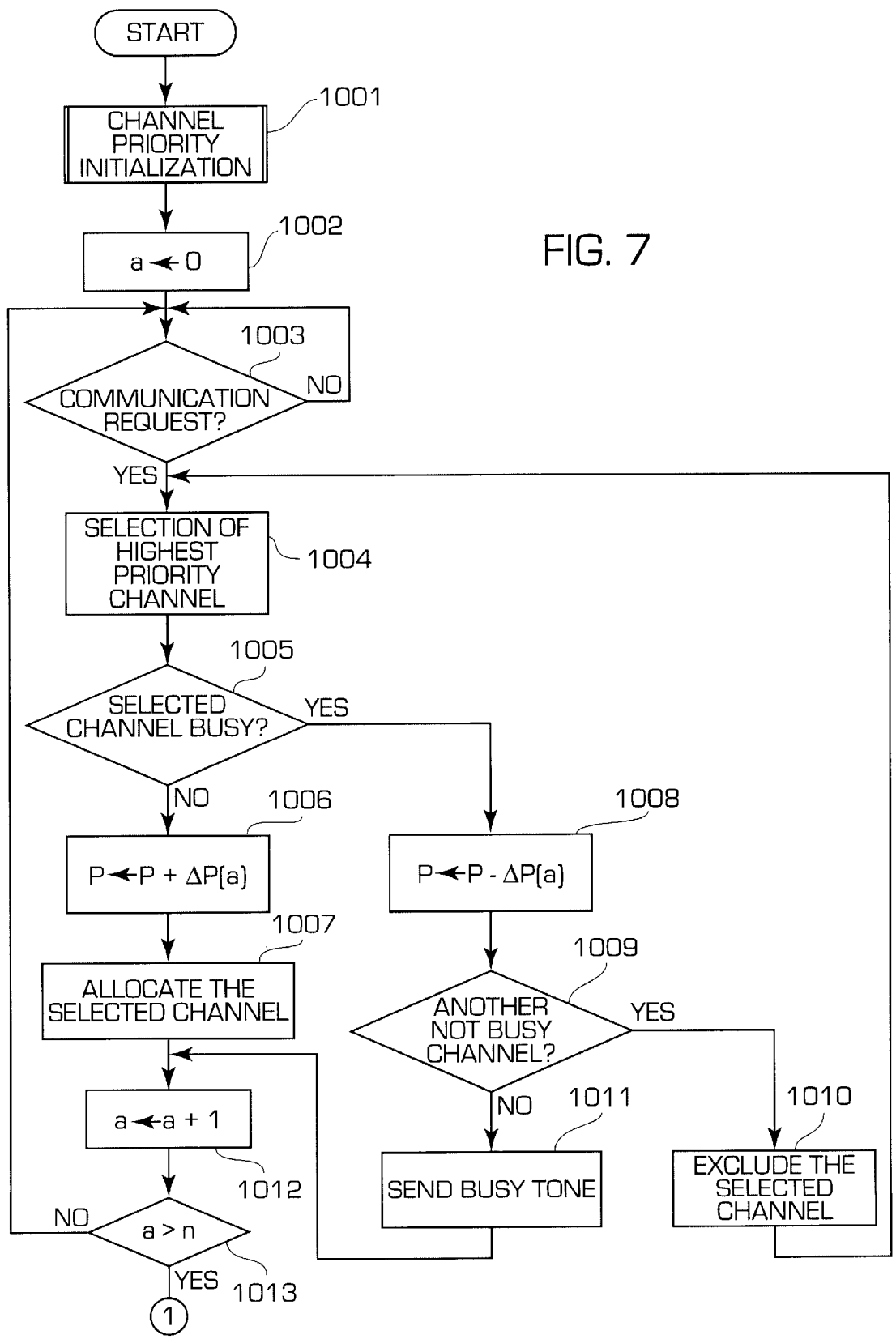
FIG. 7 is a flowchart of a first portion of an operation sequence of a dynamic channel allocation process according to the present invention, with a priority change count up to n.
Figure 8:
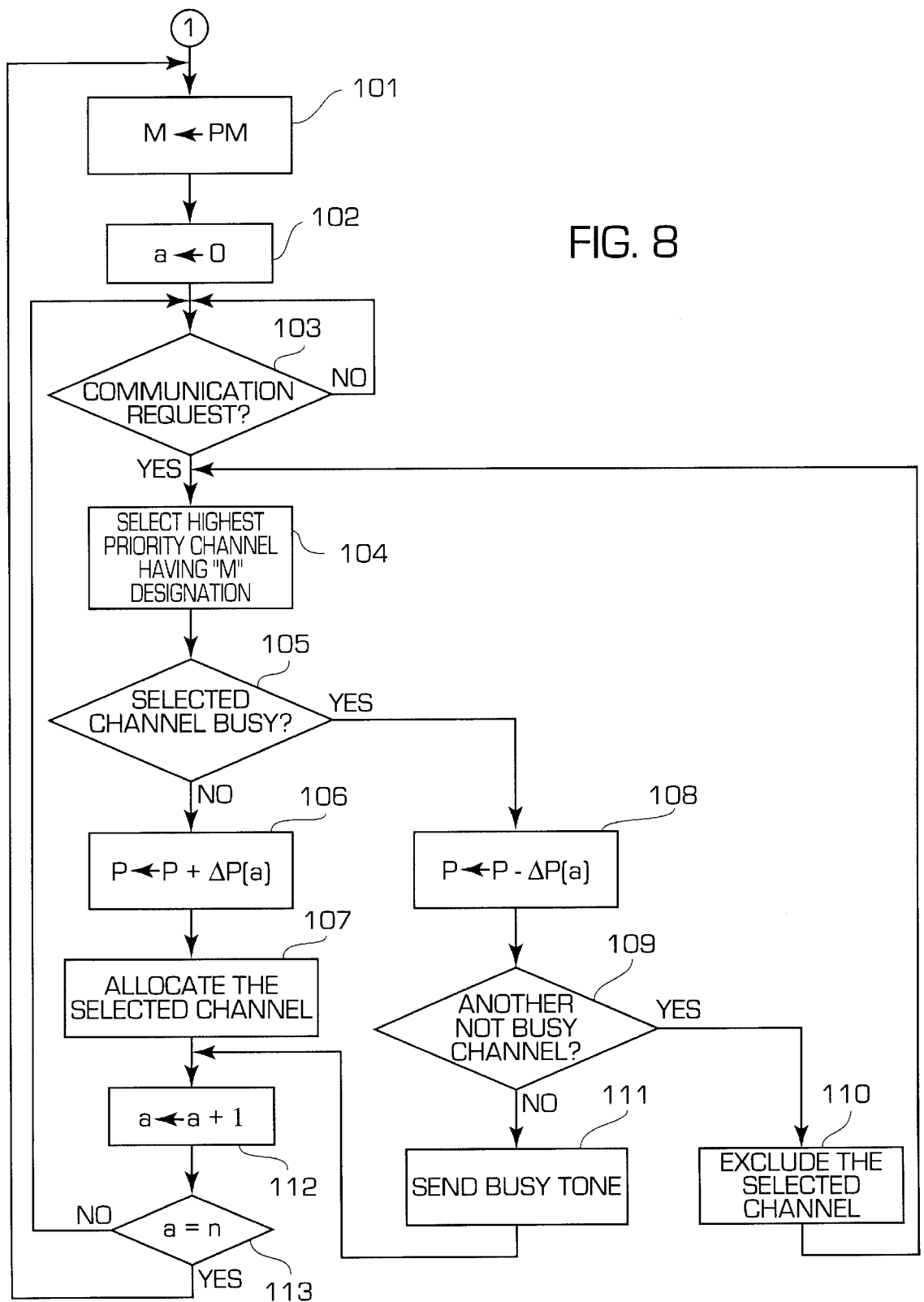
FIG. 8 is a flowchart of a second portion of the operation sequence of the dynamic channel allocation process according to the present invention, with the priority change count beyond n.

FIG. 7 shows a first portion of an operation sequence of a dynamic channel allocation process according to the present invention, and FIG. 8 shows a second portion of the operation sequence of the dynamic channel allocation process according to the present invention, the second portion including steps 101 through to 113 according to the present invention added after the step 1013 shown in FIG. 4.

The steps of the operation sequence shown in FIG. 7 are the same as those of the conventional operation sequence shown in FIG. 4 and will not be described in detail below. The operation sequence shown in FIG. 8 according to the present invention will be described below.

If the priority change count a has reached the upper limit n in the step 1013, then placing $M_1 = PM_1$ (step 101). If the value of $M_1$ is subsequently saved for the channel, then the value of $M_1$ is used as a priority and fixed. The priority change count a is returned to "0" (step 102). Thereafter, the value of the priority change count a is counted without being used as information for directly effecting on the carrier sensing (channel allocation). When a communication request occurs, the carrier sensing is carried out from a channel with a maximum priority (step 104).

With respect to channels for which the value of $M_i$ is saved, the value of $M_i$ is used as the priority. If the channel selected in the step 104 is not a busy channel (step 105), then the priority P of the selected channel is increased by $\Delta P(a)$ which depends on the priority change count a (step 106), preparing for a next carrier sensing cycle. If the priority $M_i$ is saved, then $M_i$ is not changed, and the priority P is increased but not to be subjected to the carrier sensing. Thereafter, a channel allocation process is effected (step 107).

If the channel selected in the step 104 is busy, then the priority P of the selected channel is reduced by $\Delta P(a)$ which depends on the priority change count a (step 108), preparing for a next carrier sensing cycle. If the priority $M_i$ is saved, then $M_i$ is not changed, and the priority P is reduced but not to be subjected to the carrier sensing.

After the priority P has been reduced (step 108), it is determined whether there is a channel other than the channel selected in the step 104 (step 109). If there is such a channel, then the channel selected in the step 104 is excluded (step 110), and the control returns back to the step 104 to repeat a next channel allocation cycle. If there is no remaining channel in the step 109, then a busy signal is generated, stopping the attempt to connect the call (step 111).

After the selected channel is allocated in the step 107 or the busy signal is generated in the step 111, the priority change count a is incremented by "1" (step 112). If the priority change count a has reached to the predetermined upper limit value n (step 113), then the control returns the count back to the step 101, saving again the value of $PM_i$ (i is the number of times that a has reached n), which has been increased or reduced, as $M_i$, and the step 102 and following steps are carried out. If a>n in the step 113, then the control returns to the step 103 to handle a new channel allocation request.

Figure 9:
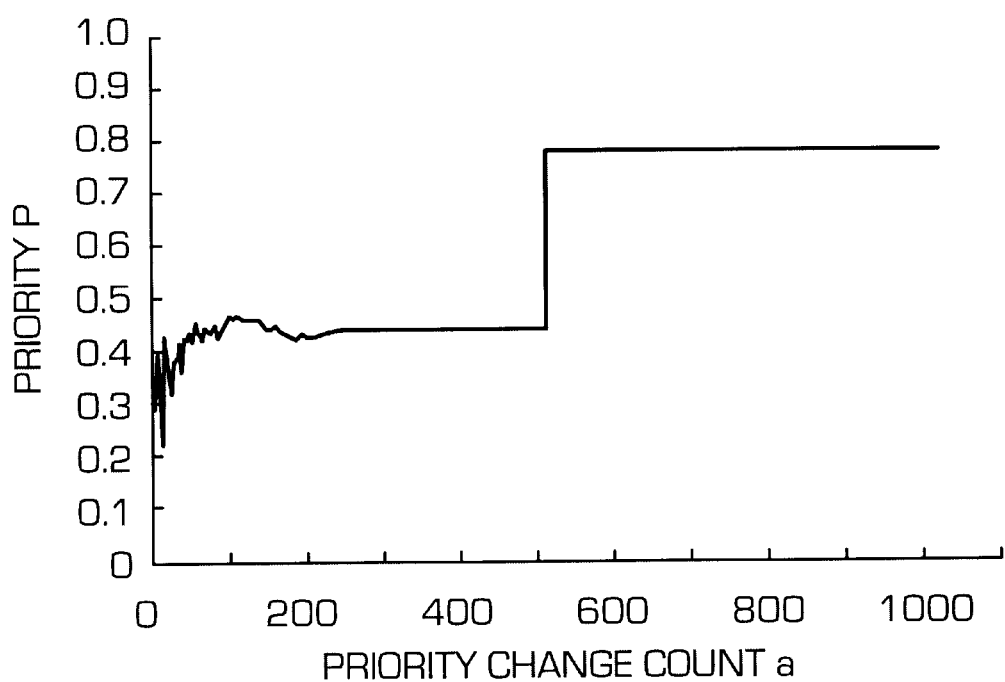
FIG. 9 is a graph showing a simulated result of the priority ratio for the priority change counts determined by the dynamic channel allocation process according to the present invention.

Accordingly, the priority is corrected into a new priority each time when the priority change count a reaches n. As a result, the priority P is determined as shown in FIG. 9.

Figure 10:
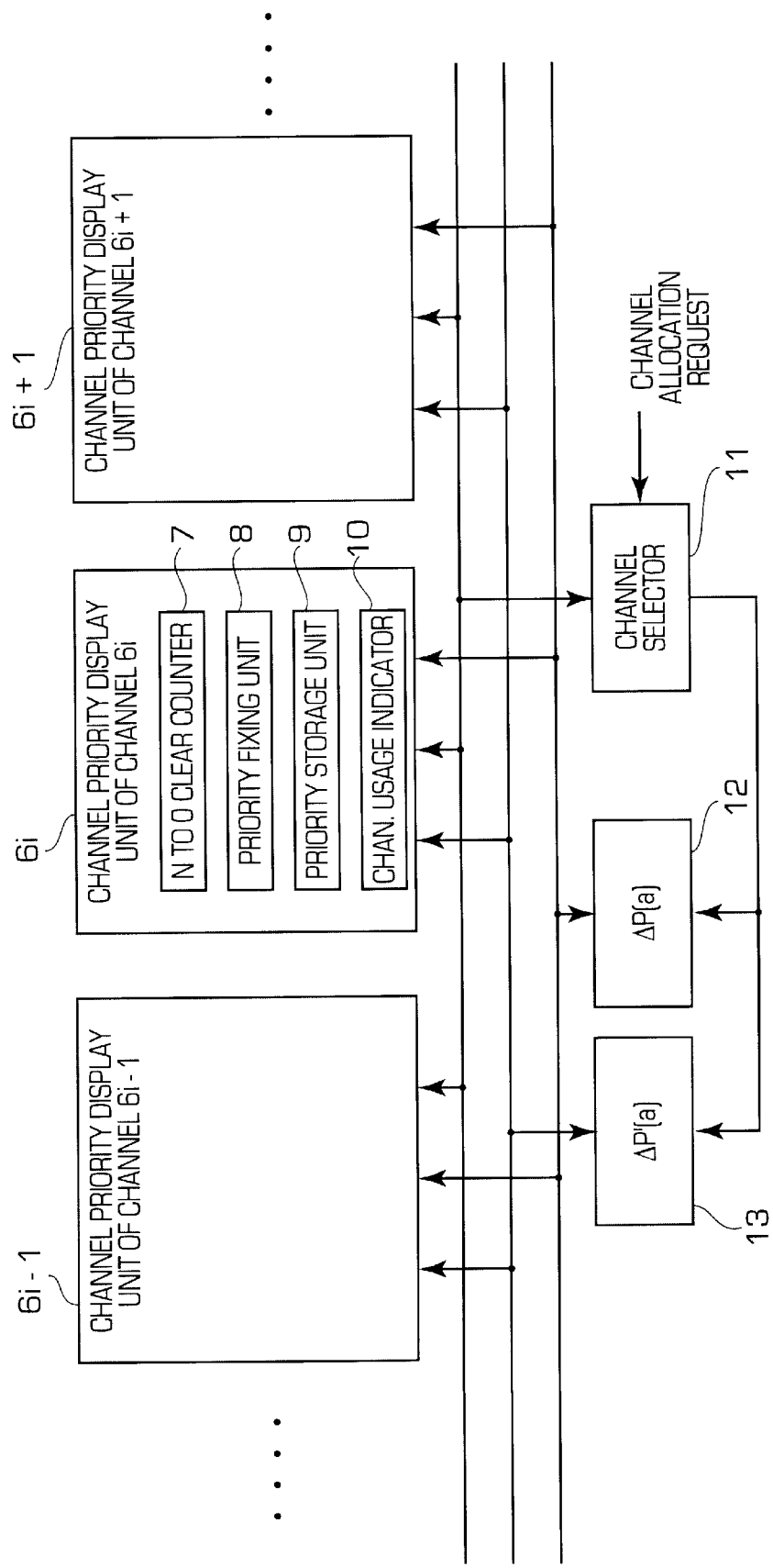
FIG. 10 is a block diagram of a major portion of a dynamic channel allocation apparatus according to the present invention.

FIG. 10 shows a block diagram of a dynamic channel allocation apparatus according to the present invention.

As shown in FIG. 10, the dynamic channel allocation apparatus according to the present invention includes a channel priority display unit $6_i$ for each of the channels. The channel priority display unit $6_i$ has an n–0 clear counter 7 which clears to "0" at each time the priority change count a reaches n, a priority fixing unit 8 for fixing and holding the priority each time the priority change count a reaches n, a priority storage unit 9 for increasing or reducing and storing the priority after the priority change count a reaches n, and a channel usage indicator 10 for indicating whether the channel in question is busy or not. The dynamic channel allocation apparatus also includes a channel selector 11 for selecting a channel in response to a channel selection request, a $\Delta P(a)$ calculating unit 12 for increasing the preceding priority function by a first priority function $\Delta P(a)$ if the selected channel is not busy, and a $\Delta P'(a)$ reducing unit 13 for reducing the preceding priority by a second priority function $\Delta P'(a)$ if the selected channel is busy.

When a channel selection request occurs, the channel selector 11 scans the channel priority display units $6_i$ to select a channel with the maximum priority. If the channel is not busy, the channel selector 11 instructs the channel to be used, and at the same time controls the $\Delta P(a)$ calculating unit 12 to increase the priority in the priority storage unit 9 in the corresponding channel priority display unit. If the channel is busy, the channel selector 11 controls the (P'(a) reducing unit 13 to reduce the priority in the priority storage unit 9 in the corresponding channel priority display unit. For scanning the priorities, each of the channel priority display units $6_i$ allows the priority storage unit 9 to be read until the priority change count a reaches n for the first time, and thereafter allows the priority fixing unit 8 to be read and allows the priority in the priority storage unit 9 to be increased or reduced.

According to the present invention, as described above, each time the priority change count a at each channel due to allocation check reaches the upper limit n, the priority is set to $M_i$, and will be used as a subsequent priority for next n channel allocation cycles. Therefore, the problems which are posed when the priority change count suffers an overflow or reaches the upper limit are solved. The dynamic channel allocation process and apparatus according to the present invention can maintain accumulated data of the past, and can quickly be stabilized even when an abrupt change happens in the environment.

While a preferred embodiment of the present invention has been described using specific terms, such description is for illustrative purposes only, and it is to be understood that changes and variations may be made without departing from the spirit or scope of the following claims.

What is claimed is:

1. A method of dynamic channel allocation in a mobile communication system, comprising the steps of:

assigning priority ($P_i$) to each of the channels between radio base stations ($2_1$~$2_4$) and radio mobile stations ($5_1$~$5_2$);

incrementing by "1" a priority change count a which represents the number of times that the channel has been selected to check for assignment to channel allocation with respect to a radio mobile station;

selecting a channel having higher priority in response to each request for channel allocation;

allocating the selected channel to the request for channel allocation and increasing the priority of the selected channel by a first priority function $\Delta P(a)$ depending on said priority change count a, if the selected channel is not busy;

reducing the priority of the selected channel by a second priority function $\Delta P'(a)$ depending on said priority change count a, if the selected channel is busy;

clearing said priority change count a to "0" when the priority change count a reaches an predetermined upper limit n, cyclically; said method further comprises the steps of:

updating and saving the priority as $M_i = P_{Mi}$ for each time the piority change count a reaches the upper limit n, where i represents times of reaching the priority change count a to upper limit n so that the $M_i$ is derived from priority change count n×i; and using said priority $M_i$ consecutively without change as the priority of the channel for channel selection until said priority change count a reaches the upper limit n at the next time.

2. The method according to claim 1, wherein said first and second priority functions are characterized in that as the value of the priority function is greater, the number of priority change count a becomes smaller.

3. A method according to claim 1, wherein said first priority function and said second priority function are identical to each other.

4. A method according to claim 1, wherein during the time said higher fixed priority $M_i$ is saved, the priority which varies by the priority function is not used for the priority.

5. An apparatus for dynamic channel allocation in a mobile communication system, comprising:

a channel priority counter for incrementing a priority change count a by "1" for each of the channels each time a channel is selected to check for channel allocation between a base station and a radio mobile station;

means for selecting a channel having a higher priority with smaller interference from another base stations;

means for allocating the selected channel to the request for channel allocation and increasing the priority of the selected channel by a first priority function $\Delta P(a)$ depending on said priority change count a, if the selected channel is not busy;

means for reducing the priority of the selected channel by a second priority function $\Delta P'(a)$ depending on said priority change count a, if the selected channel is busy;

means for clearing said priority change count a to "0" when the priority change count a reaches an upper limit n, cyclically; said apparatus further comprises:

means for updating and saving, as the high priority $M_i$ for each time the piority change count a reaches the upper limit n, where i represents times of reaching the priority change count a to upper limit n, so that the $M_i$ is derived from a value of priority change count n×i; and means for using said priority $M_i$ consecutively fixedly as the priority of the channel for channel selection until said priority change count a reaches next count n×(i+1).

6. An apparatus according to claim 5, wherein as the values of the first and said second priority function are greater, the priority change count a is smaller.

7. An apparatus according to claim 5, wherein said first priority function and said second priority function are identical to each other.

* * * * *